United States Patent Office 3,312,754
Patented Apr. 4, 1967

3,312,754
RESINOUS COMPOSITIONS COMPRISING (A) BUTADIENE - ACRYLONITRILE - CARBOXYLATED TERPOLYMER, (B) POLYEPOXIDE, (C) FLEXIBILIZING POLYMER, AND (D) DICYANDIAMIDE
Burton S. Marks, Palo Alto, Calif., and Roger S. Sedgwick, Orland Park, Ill., assignors to Continental Can Company, Inc., New York, N.Y., a corporation of New York
No Drawing. Filed Sept. 20, 1963, Ser. No. 310,443
14 Claims. (Cl. 260—837)

This invention pertains to an epoxidized rubber or elastomer. Specifically, it relates to a rubber or elastomer which is first reacted with a polyepoxy compound in a manner to preserve unreacted a portion of the epoxy groups. This pre-reacted epoxidized elastomer is then cross-linked by reacting a portion of these epoxy groups with other epoxy reactive agents and by reaction of the epoxy groups internally.

The epoxidized elastomer thus prepared is flexible and exhibits superior adhesive qualities. In particular, the epoxidized elastomers of this invention exhibit good adhesion to tin plate, aluminum, steel and other like metals so that they can be advantageously used as metal container seam adhesives.

The prepared epoxidized elastomer is a polymer having a backbone with part of the side branches containing unreacted epoxy groups. These groups are then partially reacted with other polymers which will interact with these epoxy groups under catalytic conditions. The epoxidized elastomer is also partly cross-linked by catalytic reaction between the previously unreacted epoxy groups.

The prior art has proposed rubbers and elastomers as flexibilizing agents which form polymeric mixtures with epoxy resins. These agents do not react with the epoxy groups and their addition results in flexible polymers only on curing of the epoxy resin. Other rubbers and elastomers are used solely for purposes of initially cross-linking epoxy resins or for purposes of making interpolymers with epoxy compounds where a catalyst for the epoxy-epoxy reaction is present in the initial reactants mixture. Other prior art provides a polymeric backbone chain which contains carboxyl or other epoxy reactive groups which is cross-linked solely by single polyepoxy-group-containing compounds. These cured epoxy resins exhibit the restriction that they either are not good adhesives or do not exhibit many of the desired adhesive properties.

The flexibilized epoxidized resins of this invention provide highly adherent metal adhesives which, upon curing, exhibit flexibility sufficient to allow mechanical fabrication of the parts subsequent to bonding. These adhesives exhibit high resistance to cracking and peeling and exhibit good resistance to heat deterioration whereby they may be used in containers for holding food which is being pasteurized and processed by application of heat.

The main requirements for such a metal adhesive are that it consist of only one fluid body, that it be activated and cured by application of heat, that the curing be relatively rapid, and that the viscosity of the fluid adhesive be within the range which is pumpable (less than 200,000 cps.).

An object of this invention is to provide highly adherent metal adhesives which exhibit good wetting upon metal surfaces while in liquid form and which cure with application of heat to form flexible and deterioration-resistant resinous masses.

Another object is to provide highly adherent adhesives for metal which, in cured form, have superior flexibility and resistance to mechanical deterioration and to the effects of food substances which are hot processed.

Yet another object is to present a readily pumpable single fluid adhesive mixture which is rapidly cured by application of heat.

A further object is to provide a method for producing a pumpable thermosetting adhesive which cures to an adhesive material which is highly metal adherent and flexible and exhibits the above desirable properties.

Briefly described, the flexibilized and superior metal adhesive of this invention is prepared by reacting an unvulcanized elastomer substance which serves as a backbone polymer with a polyepoxy substance, so that epoxy groups are present as side branches in the epoxidized elastomer. For this step the elastomer must contain reactive groups such as carboxyl or hydroxyl groups. The elastomer and polyepoxy are reacted in a manner to prevent cross-linking of the epoxy groups and thereby to preserve unreacted epoxy groups on said side branches. The side branches containing epoxy are then cross-linked under catalytic influence with: (1) similar epoxy side branches, (2) with epoxy resin which remains from the first step, and (3) with other epoxy group reactive resins. For the third type of cross-linking, resins having catalytically-activated epoxy-group-reactive radicals therein are preferred, e.g., hydroxyl radicals.

The first step of the above process is carried out so that substantially all of the epoxy reactive groups in the elastomer are reacted with the epoxy reactant. This epoxy reactant is selected from epoxy compounds containing polyepoxy groups and is added in excess quantity so that unreacted and largely uncross-linked side branches having epoxy groups therein are reacted with the elastomer. If an insufficient amount of polyepoxy-group-containing compound is present, then elastomer reactive groups, such as carboxyl groups, may remain and/or the reactant epoxy may internally cross-link. Such premature internal cross-linking would cause uncontrollable hardening during later curing and would result in a non-flexible product which would be largely useless as metal adhesive for subsequently fabricated metal forms. The same danger is present if an epoxy-group-activating catalyst is present during the side branch formation.

Also, if the amount of epoxy is below a minimum proportion with respect to the elastomer reactant, the epoxy groups will largely react with one another so that the subsequently added flexibilizing resin will not produce the desired effect.

When the epoxidized resin is prepared as set out above, then reacted with the flexibilizing agent, and then caused to simultaneously cross-link with other epoxy substances a superior metal adhesive results. The metal wetting properties of this adhesive are excellent and, when cured, the product is flexible and will bend with metal bending during mechanical fabricating steps performed subsequent to the adhesive application. The product when bonded to metal shows high resistance to cracking and peeling and good resistance to heat deterioration. By use of the elastomer substances of this invention a highly desirable metal adhesive is provided which is free from the undesirable properties of prior compounds used for this purpose.

The components used in the first step may be briefly described as follows: (1) the initial elastomer may be of the synthetic rubber type; e.g. acrylonitrile-butadiene, which contains epoxy reactive groups such as carboxyl groups; such groups may be easily included in the elastomer by interpolymerization with acrylic or methacrylic acid; (2) the epoxy substance preferably is a diepoxy compound such as diglycidyl ether of 2,2-(p-hydroxyphenyl) propane, but may be other polyepoxy compounds. The second step is that of adding a catalytically cross-linking flexibilizing substance for reacting with the unreacted epoxy groups present in the side branch groups and also for reacting with the excess epoxy compound remaining from step one. The flexibilizing agents preferably contain epoxy reactive radicals such as hydroxyl or carboxyl groups. An example is the copolymer of vinyl chloride and vinyl acetate with a part of the acetate branches hydrolyzed to alcohol groups. The third step is the heating or baking of the mixture of the second step to effect cross-linking and curing. The reaction equations appear generally as:

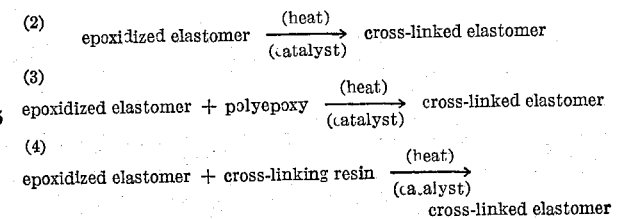

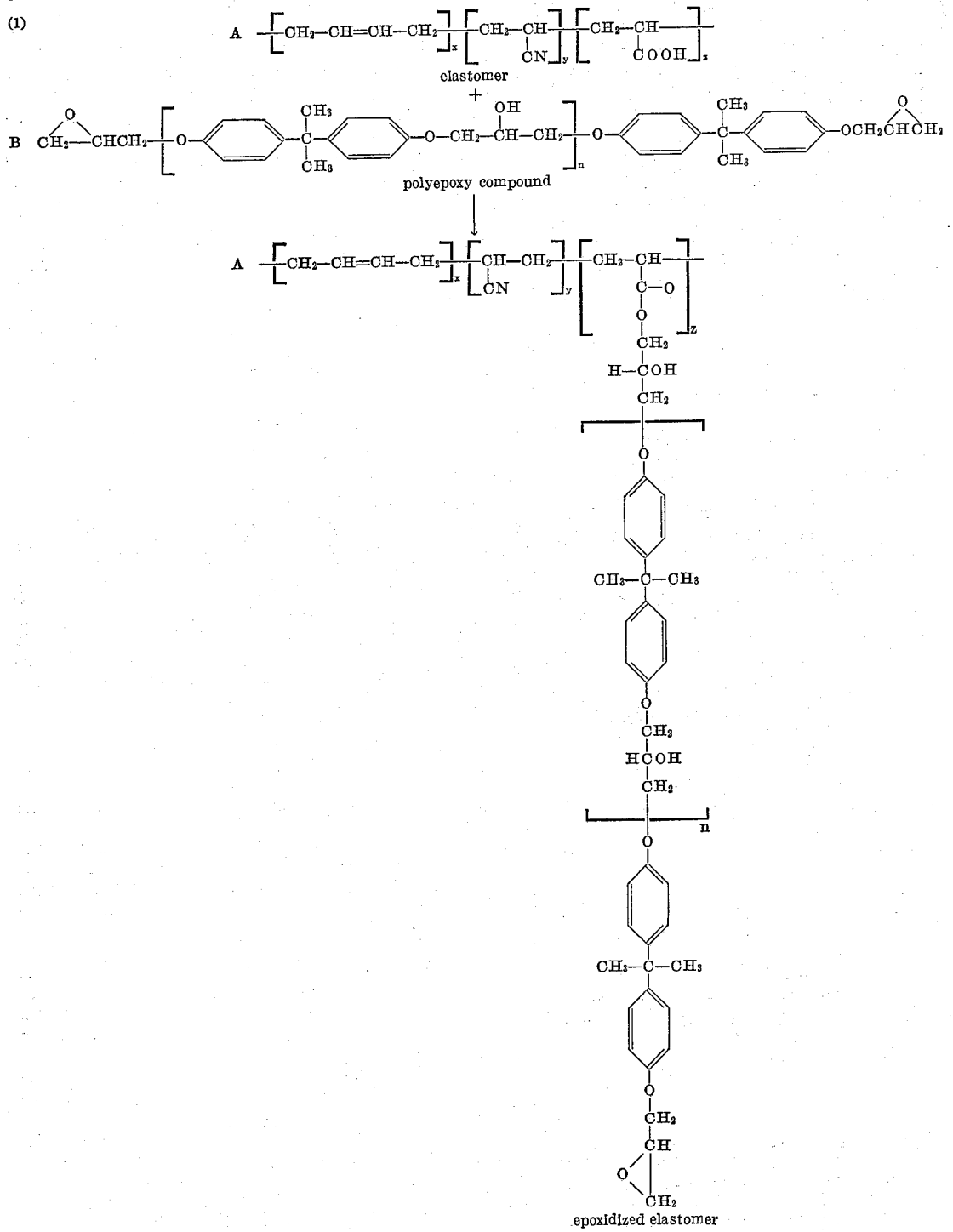

where: A indicates the amount by weight of elastomer (14–30), B indicates the amount by weight of polyepoxy (70–86), $n$ is the monomer multiple for the polyepoxy phenyl nuclei group, $x$ is the mole proportion of butadiene, $y$ is the mole proportion of acrylonitrile monomer, and $z$ is the mole proportion of acrylic acid in the elastomer terpolymer. $x:y:z$ is approximately 67:27:6.

Reaction Equation 1 shows the formation of the epoxidized elastomer. Reaction Equations 2, 3 and 4 show the simultaneous reactions which are believed to occur after the flexibilizing agent and catalyst are added and the mixture is heated.

The examples which illustrate the practice of this invention are for demonstrating operative conditions and are not intended to be limitative. Parts are by weight, unless otherwise specified.

The following abbreviations have been used for brevity of description:

"Diglycidyl-bisphenol ether" refers to a reaction product of various bisphenols with epichlorohydrin, followed by treatment with a caustic to reform the epoxy groups. The material here used may be of the structure of above reaction Equation 1, with an average $n$ of 0.03 to 0.24, an average molecular weight of 350–420, a melting point range of 8 to 12° C., and an epoxy equivalent of 175–210. "Epon 828" distributed by Shell Chemical Company has been found satisfactory bisphenol A and epichlorohydrin reaction product.

"Butadiene-acrylonitrile-carboxyl copolymer" refers to a tripolymer elastomer of butadiene, acrylonitrile and a carboxylic containing monomer such as acrylic acid or methacrylic acid. The weight proportions of monomer groups are approximately 67 - butadiene, 27 - acrylonitrile, and 6-acid monomer. The Brookfield viscosity at room temperature is 60,000 cps. and the molecular weight is low as it is a liquid at room temperatures. A satisfactory commercial resin of the acrylic acid type is "Hycar 1300X2" distributed by B. F. Goodrich Chemical Company.

"Copolymer rubber" refers to a copolymer of butadiene and acrylonitrile in approximately 60 to 40 monomer weight proportions. The specific gravity is 1.00 and it has a Mooney viscosity of 100–120. "Hycar 1411" by B. F. Goodrich Chemical Company has been found satisfactory.

"Vinylchloride-acetate-alcohol copolymer" refers to the copolymer having generally the weight proportions of 91-vinyl chloride, 3-vinyl acetate, 6-vinyl alcohol. The molecular weight is approximately 20,000–25,000 with specific gravity of 1.39 and an intrinsic viscosity in cyclohexane at 20° C. of roughly 0.56 with a softening point of 302° F. and a refractive index of 20/20° C.=1.529. Such a copolymer is marketed under the general vinyl chloride copolymer designation of VAGH. A suitable copolymer of this type is marketed by Union Carbide Chemical Co.

EXAMPLE I

Step components: Parts
(1) Diglycidyl-bisphenol ether _____ 70
    Butadiene-acrylonitrile-carboxyl copolymer__ 15
(2) Copolymer rubber _____ 10
    Vinyl-chloride-acetate-alcohol copolymer __ 5
    Dicyandiamide (catalyst) _____ 12

The step (1) reactants are reacted in absence of catalyst at approximately 300° F. for a time period of approximately one hour with no solvent present.

After this step, the reactants mixture contains the uncured liquid epoxidized butadiene-acrylonitrile carboxyl copolymer or elastomer and a portion of unreacted and excess epoxy or diglycidyl-bisphenol ether. The reaction of 70 parts of the diglycidyl-bisphenol ether with 15 parts of the copolymer containing about 6 percent by weight of acid monomer results in essentially all of the carboxyl groups of the copolymer reacting to form side groups as in the epoxidized elastomer product of the above reaction equations. An excess of the diglycidyl-bisphenol ether is present over that necessary to form such side groups and an excess of unreacted epoxy compound is present for reaction during the curing step below.

The step (2) reactants are now added simultaneously to the mixture resulting from step (1) and mixed thoroughly to obtain a homogeneous mixture of the product of step (1) and the materials of step (2). The resin mixture is then applied to the metal parts to be bonded and the third step of curing is carried out at temperature-time conditions illustratively of 375° F. for five minutes. The resulting metal to metal bond is superior to that with presently available adhesives.

The viscosity of the adhesive mixture prior to curing may be maintained at less than 200,000 cps. without inert organic solvents being added. The mixture can be heated safely to 180° F. without curing. Such heating will reduce the viscosity sufficiently to allow pumping to the curing station. Low boiling inert organic solvents may be mixed into the adhesive mixture to control the viscosity if the removal of the solvent prior to or during the curing step can be tolerated. Where such solvent removal is undesirable, reactive diluents which contain epoxy groups may be used for effecting viscosity control and acting during curing to form an integral part of the tridimensional polymer structure. Diluents such as diglycidyl ether of 1,4-butanediol can be used over the range of 0 to 10 weight percent of the adhesive mixture for this purpose. This controlled viscosity permits the mix to be stored at low temperature and pumped to the site of use. This property allows the adhesive to be handled in present metal adhesive equipment associated with production lines for making metal containers such as tin cans.

The adhesive mixture may be pumped from storage to the metal substrate which is to receive it over a range of temperature from ambient to 180° F. A conventional pump and orifice with trowel arrangement may be used to spray a selected metal area; e.g. the side seam hook areas of can bodies as they are conveyed along a forming line in can making apparatus. The physical and chemical properties of the novel adhesive mixture make it extremely desirable in such employments.

Specimens adhesively bonded with the cured adhesive of the present invention show superior peel and tensile shear strengths. Testing was carried out with hooked seam specimens having one inch seam lengths and hooks approximately $\frac{1}{16}$ inch wide. The tests used were those normally used to evaluate side seam seals in can making research.

The proportion of epoxy resin to elastomer is critical in that when low proportions of epoxy are used the reacting mixture gels in the step (1) reaction. This seriously limits subsequent additions of material. The minimum epoxy:elastomer proportion depends upon the specific epoxy used. For the diglycidyl-bisphenol ether of Example I the proportion minimum is 55:45. Generally, a minimum ratio greater than unity is employed. The epoxy resin used resulted from the reaction of 2,2-bis(p-hydroxyphenyl) propane with a large molar excess of epichlorohydrin to yield the halohydrin which is then treated with sodium hydroxide to yield the epoxy resin; diglycidyl polyether of 2,2-bis(p-hydroxyphenyl) propane. The epoxy number (grams resin containing one molar equivalent of epoxide) is about 180.

It has been found that with epoxy resins of the above type having larger epoxy numbers, different epoxy resin: elastomer ratios can be used. Table I sets out the variation in the ratio for various usable epoxy numbers.

TABLE I

| Epoxy Number | Epoxy Resin:Elastomer |
| --- | --- |
| 180 | 55:45 |
| 220 | 67:45 |
| 250 | 76:45 |

The acrylonitrile:butadiene rubber copolymer of Example I may be increased in parts by weight from 10 up to 15, when desired.

The following hypothesis may be stated for the reaction mechanism of the above example. The diepoxy glycidyl-bisphenol ether compound reacts by one of its epoxy groups with a carboxyl group of the butadieneacrylonitrile-carboxyl copolymer but without immediate cross-linking between the epoxy group containing branches which are appended to the epoxidized elastomer. Such reaction occurs at substantially all carboxyl groups. During the third step of curing, the vinyl chloride-acetate-alcohol copolymer may react with the unreacted epoxy groups through the hydroxyl groups present by reason of the included alcohol radicals. The copolymer rubber has only double bond unsaturation; but it is not presently known whether the acrylonitrile-butadiene copolymer rubber, as a Step (2) component, reacts at its double bonds with other components.

The final cured structure is a butadiene-acrylonitrile-carboxyl copolymer or elastomer having branches attached via the carboxyl groups, which branches contain phenyl nuclei present in the epoxy resins. These side branches are interconnected by reaction of their previously unreacted epoxy groups with other like epoxy and hydroxyl containing groups and with other epoxy and hydroxyl group containing compounds.

Equivalents

In the above example the butadiene-acrylonitrile-carboxyl copolymer is an example of a specific liquid rubber. Other liquid rubbers are usable and particularly when addended carboxyl groups are in a range of 2 to 8 molar percent of mono-COOH containing monomer in the elastomer. The ratio of epoxy resin:elastomer in Step 1 of Example 1 is preferably varied when greater than 6 molar percent of mono-COOH monomer is present in the elastomer. For 2–6 mole percent the ratio is, as above, 55:45 and for about 8 mole percent a ratio of 73:27 is preferred. The carboxyl groups are preferably distributed evenly over the backbone chain length. Such carboxyl groups may be provided by either acrylic or methacrylic acid monomers.

The carboxyl group content is of critical significance. At lower COOH content a decreased cross-linking density with resulting slower cure and usually decreased cohesive strength results. At higher COOH content, an increase in cross-linking produces a strong structural adhesive, but one which suffers loss of flexibility and even tends to brittleness.

Polyepoxy compounds which may be used for the diglycidyl-bisphenol ether of Example I are: diglycidyl ethers of aliphatic glycols, dihydric phenols, and various bisphenols. The aliphatic glycols may be butanediol, glycerine (the diglycidyl ether thereof marketed as "Epon 812" by Shell Chemical Co.), propylene glycol, ethylene glycol, diethylene glycol, and dipropylene glycol. Various of the isomeric dihydric phenol such as resorcinol and hydroquinone may be employed. The various bisphenols which may be employed for producing the polyepoxy compounds are: bis(p-hydroxyphenyl) methane (Bisphenol F), and 2,2-bis(4-hydroxyphenyl)propane (Bisphenol A).

The vinyl chloride-acetate-alcohol copolymer of Example I may be replaced in whole or in part by other flexibilizing substances such as liquid copolymers of butadiene and acrylic or methacrylic acid. Epoxy reactant elastomers such as butyl or crude rubber and maleic anhydride mixtures or carboxylated butadiene-styrene or acrylonitrile copolymers can be used.

In step (3) curing conditions for Example I are specific and within the permissible temperature:time range of 375–400° F. for 4 to 1½ minutes. The short time of cure at the relatively low curing temperature is attributable in part to the fact that the COOH groups and one of the epoxy groups of the polyepoxy compounds have previously reacted in step (1) and as no catalyst is present no crosslinking occurs upon continued heating at 300° F. The catalyzed epoxy-to-hydroxyl group reactions are such that considerably less external heat is required.

It is obvious that the illustrative practices are not restrictive; and that the invention can be practiced in many ways within the scope of the appended claims.

What is claimed is:

1. A method of preparing a thermosetting flexible resinous composition which comprises reacting (1) 14 to 45 parts by weight of a butadiene-acrylonitrile-carboxyl terpolymer wherein the addended carboxyl groups are present in amounts ranging from 2 to 8 molar percent, (2) 55 to 86 parts by weight of a polyepoxy compound selected from the group consisting of diglycidyl ethers of polyhydric alcohols, and diglycidyl ethers of dihydric phenols, and (3) a flexibilizing copolymer in the presence of an effective amount of a dicyandiamide catalyst; said flexibilizing copolymer selected from the group consisting of copolymers of vinylchloride-vinylacetate-vinylalcohol, copolymers of butadiene-acrylic acid, copolymers of butadiene-methacrylic acid, carboxylated copolymers of butadiene-styrene and carboxylated copolymers of butadiene-acrylonitrile.

2. The method of claim 1 further characterized in that the terpolymer is a polymer of acrylic acid-butadiene-acrylonitrile.

3. The method of claim 1 further characterized in that the flexibilizing polymer is a copolymer of vinylchloride-vinylacetate-vinylalcohol.

4. The method of claim 1 further characterized in that the diglycidyl ethers of the dihydric phenols are diglycidyl ethers of bisphenol.

5. The method of claim 4 further characterized in that the bisphenol is selected from the group consisting of bis(p-hydroxyphenyl)methane, and 2,2-bis(4-hydroxyphenyl)propane.

6. A method of preparing a thermosetting-flexible resinous composition which comprises reacting the components of claim 1 in the presence of the catalyst and subsequently curing said composition at temperatures ranging from about 375° to 400° F. for periods ranging from 1.5 to 5 minutes.

7. A method of preparing a thermosetting-flexible resinous composition which comprises reacting 15 parts by weight of a butadiene-acrylonitrile-acrylic acid terpolymer wherein the carboxyl groups are present in amounts ranging from 2 to 8 molar percent, 70 parts by weight of a diglycidyl ether of bisphenol, 15 parts by weight of a butadiene-acrylonitrile copolymer and 10 parts by weight of a vinylchloride-vinylacetate-vinylalcohol copolymer; said reaction taking place in the presence of an effective amount of a dicyandiamide catalyst.

8. A thermosetting-flexible resinous composition consisting essentially of (1) 14 to 45 parts by weight of a butadiene-acrylonitrile carboxyl terpolymer wherein said addended carboxyl groups are present in amounts ranging from 2 to 8 molar percent, (2) 55 to 86 parts by weight of a polyepoxy compound selected from the group consisting of diglycidyl ethers of polyhydric alcohols and diglycidyl ethers of dihydric phenols and (3) a flexibilizing copolymer in the presence of an effective amount of a dicyandiamide catalyst; said flexibilizing copolymer selected from the group consisting of copolymers of vinylchloride-vinylacetate-vinylalcohol, copolymers of butadiene-acrylic acid, copolymers of butadiene-methacrylic acid, carboxylated copolymers of butadiene-styrene, and carboxylated copolymers of butadiene-acrylonitrile.

9. The composition of claim 8 further characterized in that the diglycidyl ethers of the dihydric phenols are diglycidyl ethers of bisphenol.

10. The composition of claim 9 further characterized in that the bisphenol is selected from the group consisting of bis(p-hydroxyphenyl)methane, and 2,2-bis(4-hydroxyphenyl)propane.

11. The composition of claim 8 further characterized in that the terpolymer is a polymer of acrylic acid-butadiene-acrylonitrile.

12. The composition of claim 8 further characterized in that the terpolymer is a polymer of methacrylic acid-butadiene-acrylonitrile.

13. The composition of claim 8 further characterized in that the flexibilizing polymer is a copolymer of vinylchloride-vinylacetate-vinylalcohol.

14. A metal article having at least two contiguous metal areas, said metal areas bonded one to the other by the thermosetting-resinous composition of claim 7.

References Cited by the Examiner

UNITED STATES PATENTS

| 2,872,366 | 2/1959 | Kiernan | 260—891 |
| 2,947,338 | 8/1960 | Reid | 260—837 |

MURRAY TILLMAN, *Primary Examiner.*

P. LIEBERMAN, *Assistant Examiner.*